United States Patent [19]

Konkle

[11] 4,278,389
[45] Jul. 14, 1981

[54] MOBILE VEHICLE INVALID LIFT ASSEMBLY

[76] Inventor: John H. Konkle, 37238 Immigrant Rd., Pleasant Hill, Oreg. 97401

[21] Appl. No.: 83,869

[22] Filed: Oct. 11, 1979

[51] Int. Cl.³ .............................................. B60P 1/46
[52] U.S. Cl. ..................................... 414/540; 414/921
[58] Field of Search ..... 414/540, 545, 558, DIG. 921; 280/163, 164 R, 164 A, 166; 187/9

[56] References Cited

U.S. PATENT DOCUMENTS

| | | | |
|---|---|---|---|
| 1,977,655 | 10/1934 | Troell | 414/545 |
| 2,851,174 | 9/1958 | Lewis | 414/545 |
| 3,008,533 | 11/1961 | Haberle | 280/166 UX |
| 3,710,962 | 1/1973 | Fowler, Jr. | 414/545 |
| 3,776,402 | 12/1973 | Bryan | 414/545 |
| 3,800,915 | 4/1974 | Himes | 414/545 |

Primary Examiner—Robert W. Saifer
Attorney, Agent, or Firm—Kolisch, Hartwell & Dickinson

[57] ABSTRACT

Invalid lift mechanism including framework supported on the underlying frame of a trailer which supports an elevatable platform. The platform is also pivotable to swing it from a horizontal to a vertical position. Cables and winches are provided for raising the platform and pivoting the platform.

4 Claims, 4 Drawing Figures

MOBILE VEHICLE INVALID LIFT ASSEMBLY

This invention relates to lift mechanisms, and more particularly to an invalid lift assembly such as might be incorporated with the cabin structure of a vehicle such as a trailer for lifting a person from ground level to the level of the sill of the door for the trailer.

The inventor has observed that there are a number of disabled persons in our society, such as those who must use crutches or wheel chairs to move from place to place, who are prevented from participating in trailer living by reason of not being able to climb the distance required to enter the door of the trailer. Lift mechanisms known to date generally may be characterized as having a relatively complex structure, and for the most part are not suitable for incorporation with a vehicle such as a trailer which derives its principal support from beams underneath the trailer and includes side walls in the cabin of the trailer inadequately braced to withstand any but the usual stresses to be expected in such side walls. Another disadvantage of known lift mechanisms is that many require hydraulics for actuation, a disadvantage since most trailers are not provided with a pressurized hydraulic system. Further, for a lift assembly to meet general acceptance, it should be capable of being readily mounted on a trailer without extensive modification of the trailer's design.

In general terms, an object of this invention is to provide an improved invalid lift assembly which is simple and reliable and which takes care of the above-indicated problems in an entirely satisfactory and practical manner.

More specifically, an object of the invention is to provide invalid lift mechanism featuring uprights normally straddling the door of the cabin structure in the vehicle deriving their support from support arms extending transversely of and attached to longitudinally extending beam structure for the vehicle, and platform carrying elongate riding arms which are vertically movable on the uprights to shift the platform from ground level to the level of the sill in the door.

Yet another object of the invention is to provide such a lift assembly wherein the riding arms are raised on the uprights in unison by cables extending from the riding arms and over training means on the uprights and then to a powered take-up means actuatable to take in the cables. With the organization it is possible to eliminate exposed expensive machinery producing the lifting action. Further, it is well adapted for an electrically powered means such as a winch for producing retractive movement of the cables necessary to produce elevation of the lift.

The invention further features a lift platform which is pivotable between horizontal and vertical positions, the platform, like the riding arms in the lift assembly, being movable under power through a cable system.

The lift assembly contemplated is readily mounted on a conventional vehicle, such as a trailer, with minimal modification of the trailer. Powered means, such as an electrically powered winch for producing cable retraction, may be mounted underneath the vehicle in a relatively concealed and tamper-proof location. Lift assemblies that have been constructed as contemplated are capable of lifting loads far exceeding the weight of the usual invalid and wheel chair. The lift assembly is reliable and relatively maintenance free.

These and other objects and advantages are attained by the invention, which is described in conjunction with accompanying drawings, wherein.

Figure 1:
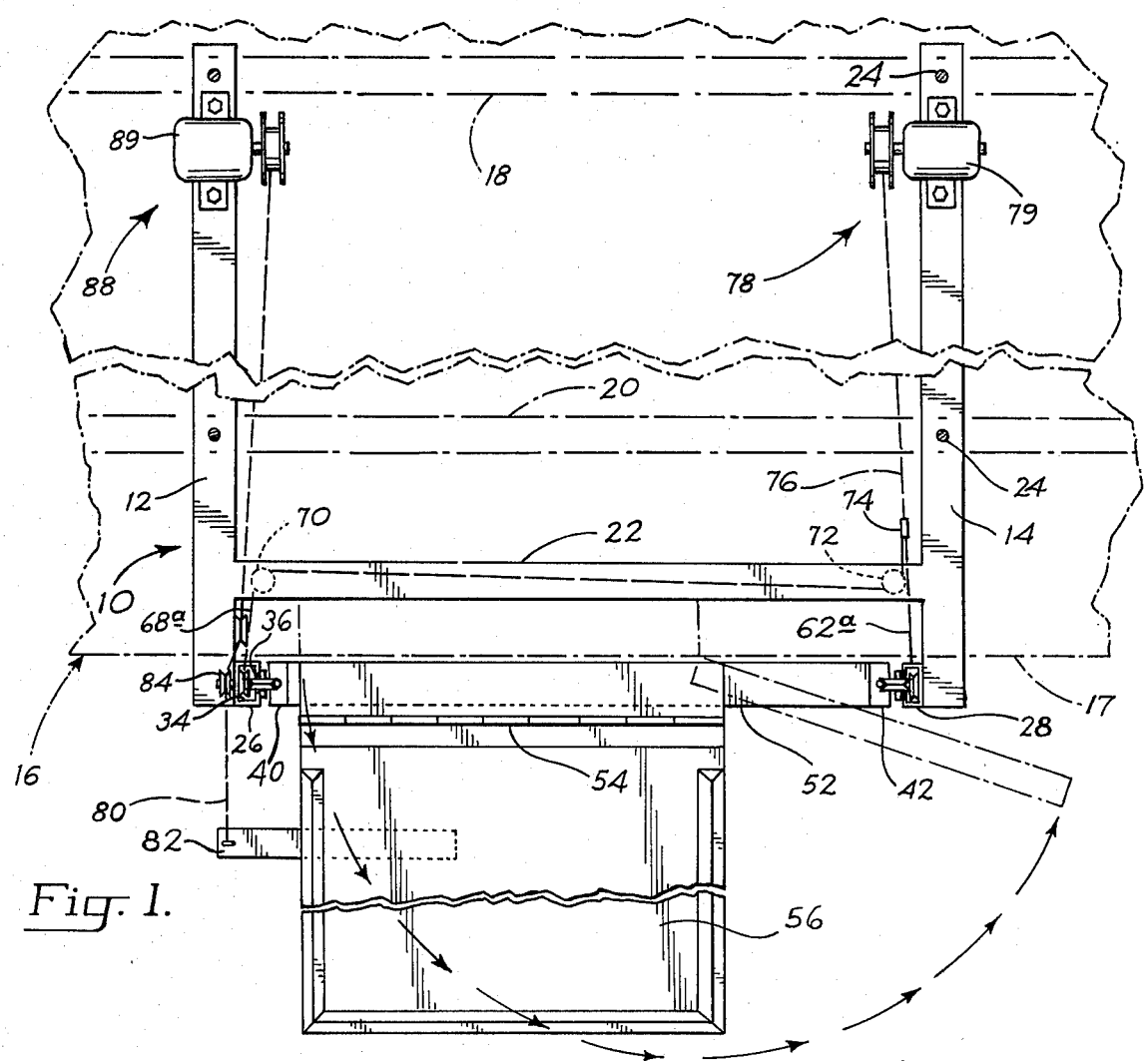
FIG. 1 is a plan view of a lift assembly constructed according to the invention, and further illustrating how such is incorporated with a vehicle such as a trailer, portions of the trailer in FIG. 1 and other drawings being illustrated in dot-dash outline.
Figure 3:
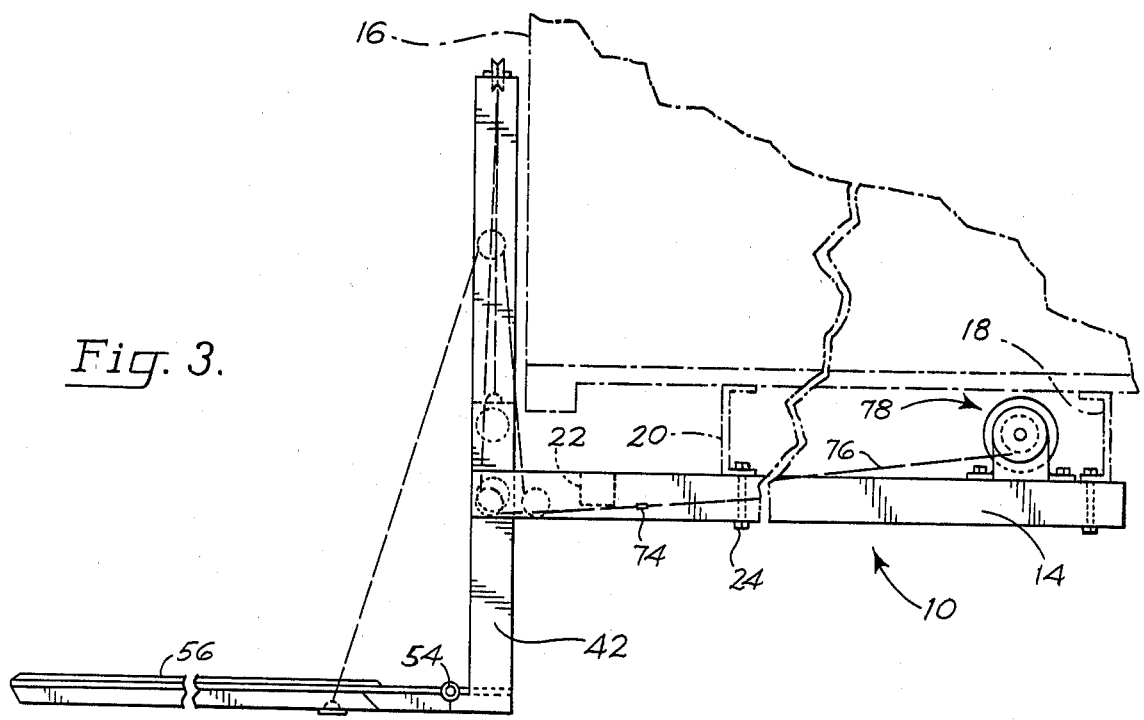
FIG. 3 is a side elevation of the structure illustrated in FIG. 2.

Referring now to the drawing, and more particularly to FIGS. 1 and 3, the lift assembly illustrated includes framework generally shown at 10, including a pair of elongate generally parallel support arms 12 and 14 which, with the assembly installed, extend under the trailer and transversely of the longitudinally extending beam means forming the main supporting frame of the trailer. In the drawings the trailer is generally depicted at 16, and the longitudinally extending beam means comprises a pair of parallel elongate beams extending under the floor of the trailer, shown in the drawings at 18 and 20. Producing a rigid unit of the support arms in the framework in cross beam 22, which may be secured at its ends in a suitable manner, as by welding to the support arms 12, 14.

The support arms may be secured to the beams 18, 20 in any suitable manner. In the embodiment shown, the attachment is by fasteners 24 extending through suitably prepared holes in the longitudinal beams 18, 20. If desired, clamps may be employed in making the connection, which would eliminate the preparation of such holes and even this modification of the basic trailer unit.

As will be evident in viewing FIG. 1, the support arms have one set of their ends protruding beyond a side of the cabin structure in the trailer, such side of the cabin structure being indicated at 17 and these ends being those located at the bottom of the figure in FIG. 1. These protruding ends are used in the mounting of a pair of uprights constituting an additional part of framework 10 and indicated at 26, 28. These uprights have their bottom ends rigidly secured, as by welding, to the protruding ends of the support arms, and extend vertically upwardly in spaced, parallel relation from their mounting on the support arms. The uprights are spaced outwardly slightly from the trailer side, straddle the doorway of the vehicle shown at 30, and extend to an elevation well above the sill of the door indicated at 32.

Each upright, as exemplified by upright 26 shown in FIG. 1, has a substantially rectangular cross-sectional outline with wall portions defining a substantially hollow interior 34, and a slot 36 extending along the length of the upright on its inner side.

Figure 2:
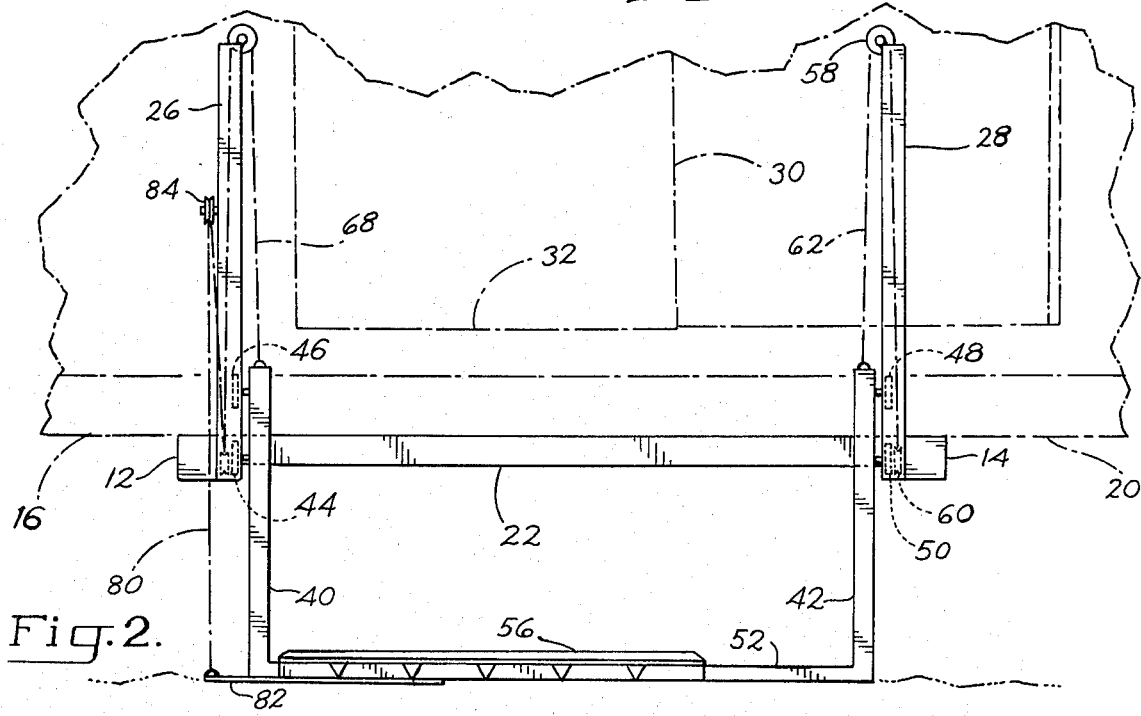
FIG. 2 is a side elevation view of the lift assembly shown in FIG. 1, and illustrating a platform in the lift assembly lowered and at ground level.

Referring to FIG. 2, shown at 40 and 42 are what are referred to herein as elongate riding arms. The riding arms extend substantially parallel to the uprights and each is mounted for relative vertical movement along an associated upright. Thus, rollers 44, 46 riding within upright 26 with mountings extending through slot 36 in the upright support riding arm 40 for vertical movement along upright 26 and rollers 48, 50 similarly support riding arm 42 for relative vertical movement along upright 28. The riding arms are movable from a lowered position where their bottom ends are adjacent ground level to a raised position where the bottom ends of the riding arms are approximately at the level of door sill 32.

Operatively interconnected between the bottom ends of the riding arms is platform structure comprising a platform bar 52 having opposite ends secured to the bottom ends of the riding arms. Pivotally mounted on the platform bar through hinge 54 is platform 56. In the embodiment of the invention illustrated, the platform is swingable from a horizontal position defined by the rear edge of the platform striking bar 52, and a raised vertical position, illustrated for the platform in dashed-outline in FIG. 4, with the platform substantially parallel to the side of the cabin structure in the vehicle.

To raise the riding arms and the platform structure which is supported between the bottom ends of these arms, a powered means is provided, including cables which are retracted or taken in for the purpose of raising the arms and the platform and which are let out when the platform is lowered.

Figure 4:
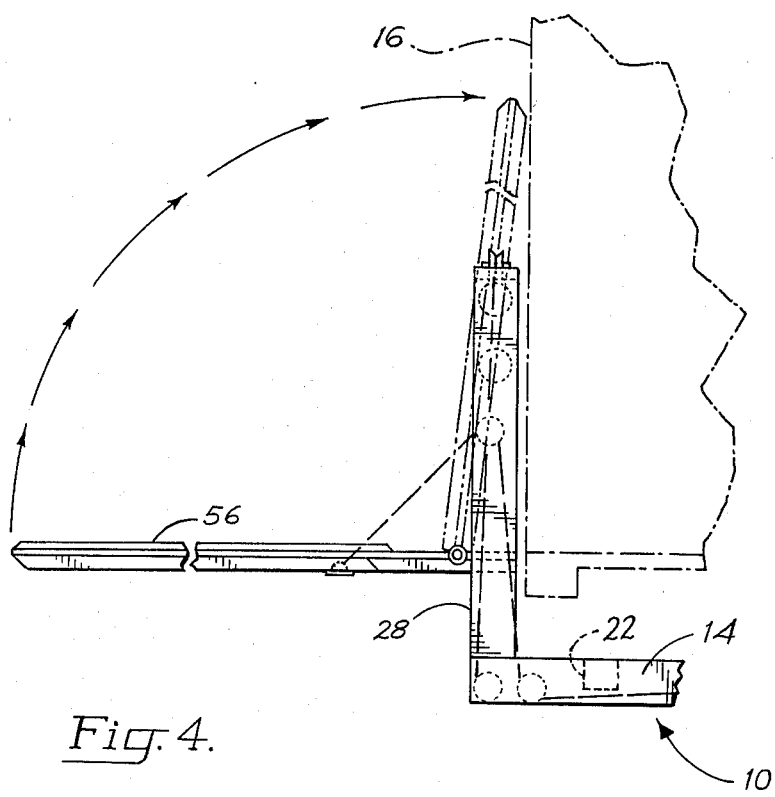
FIG. 4 illustrates portions of the lift assembly with the platform therein in a raised position, and further illustrates in dashed outline the platform swung to a vertical position.

Specifically, and with reference to FIGS. 2, 3 and 4, it will be noted in connection with riding arm 42, adjacent the top of upright 28 which mounts the arm, is a pulley or training means 58. Adjacent the bottom end of upright 26 is another pulley or training means 60. A cable 62 secured to the top end of riding arm 42 is trained over pulley 58 at the top of upright 28 and pulley 60 at the bottom of upright 28 and thence inwardly under the trailer in an expanse shown at 62a. Similar pulleys are provided for upright 26, training a cable 68 which extends inwardly in an expanse 68a. Cable expanse 68a extends over pulleys 70, 72 mounted on cross beam 22 and this cable, together with cable 62, are connected through connector 74 to a common cable 76. Mounted on support arm 14 is a power take-up means, more specifically a powered winch 78 including electric motor 79 driving a drum which has cable 76 trained thereover. With energizing of the motor in one direction, cable 76 and with it cables 68, 62 are taken up or retracted to cause lifting of the riding arms in unison. Letting out of the cable 76 results in lowering of the lifting arms.

The platform is pivoted between horizontal and vertical positions by a cable 80 which extends from a bar 82 secured to the platform and projecting out to one side thereof. Shown at 84 is a pulley or training means journaled on upright 26, and at 86 a pulley or training means journaled on support arm 12. Power take-up means comprising winch 88 including motor 89 are actuated to take in and let out this cable.

The operation of the lifting apparatus should be obvious from the above description. For an invalid to get onto the platform, the platform is lowered to ground level through lowering of the riding arms and letting out of the cables connected to these riding arms. This places the platform at the position illustrated in FIGS. 2 and 3, the riding arms having bottom ends extending well below the bottom ends of the uprights. On a person moving onto the platform, the riding arms are raised by retracting cables 62, 68 through operation of winch 78. This is effective to bring the bottom ends of the riding arms and the platform mounted thereon to the level of the door sill. At this level an occupant may move off the platform into the trailer or an occupant of the trailer can move from the trailer onto the platform. In the latter event, the occupant moves to ground level through letting out cables 62, 68 to return the platform to its lowered position.

To prepare the lift assembly for road transport, the lift platform is raised to place the same at the level of the door sill. Platform cable 76 is taken in to pivot the platform about its hinge 54 and shift the same from a horizontal position to an upright position directly adjacent the side of the trailer.

It will be noted that the lift assembly derives its entire support from the beam structure under the trailer, more specifically the support arms extending transversely of longitudinally extending beams. There is no connection made with the sides of the trailer cabin structure, which are not ordinarily designed to carry an appreciable load. Minimum modification of the trailer vehicle is required. The power driven means for actuating the lift assembly, i.e. the winches, are mounted under the trailer in a concealed position.

It is claimed and desired to secure by Letters Patent:

1. In combination with a vehicle including a longitudinally extending beam means forming the main supporting frame of the vehicle, and cabin structure disposed over and supported on said beam means, including a doorway in the side of the structure providing access to the interior of the structure, a lift assembly comprising:

a pair of spaced uprights positioned outwardly of and unjoined to said side of said structure, and adjacent opposite sides, respectfully, of said door, having upper ends above the sill of the door, a support arm for each upright joined to the base of the upright and extending under the vehicle and transversely of said beam means, and mounted on said beam means, said support arms providing the sole support for the uprights, an elongate riding arm extending parallel to each upright and mounted for relative movement along the length of the upright between a lowered position where the base of the riding arm is below the base of the upright and adjacent ground level, and a raised position where the base of the riding arm is at the level of the sill of the door, a platform operatively interconnected between the bases of the riding arms for relative pivotal movement about a horizontal axis extending transversely of said riding arms, between horizontal and vertical positions, first and second cable training means mounted on and adjacent the top and bottom, respectively of each upright, and powered means for raising said riding arms in unison from their lowered to their raised positions to move the platform from ground level to the elevation of the sill of the door, said powered means including cables for said riding arms extending from connections with the riding arms over said first and then said second training means and thence under the vehicle, and powered take-up means under the vehicle actuatable to take up said cables by retracting such over said training means.

2. The combination of claim 1, which further includes a platform cable connected to said platform, and first and second training devices associated with one of said uprights with one mounted adjacent the base of the upright and the other mounted on the upright in a position located upwardly on the upright from said one, said platform cable extending from its connection with the platform over said other and said one training device and thence under said vehicle, and powered take-up means actuatable to take up said cable by retracting such over said training devices, such take up of the cable being effective to swing the platform from its horizontal to its vertical position.

3. The combination of claim 1, wherein said beam means comprises a pair of beams extending longitudinally of the vehicle, one adjacent each side thereof, and said support arms extending across both beams and are secured to each.

4. A lift assembly for lifting an invalid to the level of the door sill in the door of a cabin which is part of a vehicle comprising:

a pair of laterally spaced elongate support arms adapted to extend under the frame of the vehicle for attachment thereto, an upright secured adjacent its bottom end to an end of each support arm, said upright with the assembly in operative position extending upwardly from the support arms in laterally spaced parallel raltion, an elongate riding arm extending parallel to each upright mounted for relative movement along the upright between a lowered position where the bottom end of the arm protrudes below the bottom end of the upright and a raised position where the bottom end is above the bottom end of the upright, a cable secured to each riding arm, and first and second training means adjacent the top and bottom, respectively, of each upright training the cable whereby such extends from the riding arm over said first and then said second training means, a powered winch means for collecting said cables in windings, a horizontal platform pivotally mounted between the two riding arms adjacent the bottom ends of the riding arms for pivotal movement between horizontal and vertical positions, which platform is raised on upward movement of the riding arms produced by taking up of said cables, a platform cable connected to the platform, cable training devices associated with an upright training the platform cable whereby such extends from its connection with the platform toward the upright and then downwardly along said upright and thence rearwardly of the upright, and powered means for taking up the platform cable to retract such cable over said training devices and cause said platform to swing from a horizontal to a vertical position.

* * * * *